Aug. 29, 1939.   J. P. TARBOX   2,171,438
METHOD OF MANUFACTURING TIRE TREAD
Original Filed March 5, 1936

INVENTOR.
John P. Tarbox

Patented Aug. 29, 1939

2,171,438

UNITED STATES PATENT OFFICE 2,171,438

METHOD OF MANUFACTURING TIRE TREAD

John P. Tarbox, Philadelphia, Pa., assignor to Edward G. Budd Manufacturing Company, Philadelphia, Pa., a corporation of Pennsylvania Original application March 5, 1936, Serial No. 67,190. Divided and this application March 11, 1937, Serial No. 130,266

7 Claims. (Cl. 154—14)

This invention, while it relates to treads for wheels in general, has its greatest adaptability and its greatest resultant advantage in treads for automobile tires. Its outstanding object is to prevent slippage of the automobile wheel upon wet or snowy or icy pavements. These same qualities, however, will make it useful on wheels wherever required to transmit power or exert force through frictional engagement of a wheel surface. From this angle indeed the invention may be applicable to other mechanical devices than wheels embodying frictionally acting surfaces.

This application is a division of my co-pending application Serial Number 67,190, filed March 5, 1936.

It has heretofore been proposed to prevent automobile wheels from slipping by embodying in the treads of the rubber tires an abrasive material in granular form. The rubber tread of the tire either alone or in conjunction with the tire constitutes an article of manufacture. Unique processes are required to produce the article. My invention has to do with both.

The qualities of the abrasive friction or other granular road gripping material which I employ are the following. The grains, instead of being relatively fine and small are relatively large, in particular of the size of large shot used in shooting game such as duck or buckshot, or let us say, of the size of garden peas. However, as respects other qualities, my invention is not necessarily limited to the sizes of the grains. The grains are moreover possessed of many recesses on their exterior surfaces and the exterior surfaces are generally irregular, as indeed is or may be the general shape of the grain itself. The recesses indeed may extend all the way through the grain, the grain being therefore constituted spongy or porous in accordance with the size of the permeating recesses and the nature of the material employed. The specific gravity of the material of the grains is preferably in the general neighborhood of specific gravity of the rubber body of the tread in which the grains are to be used, though the aspects of my invention may modify this preference. The hardness of the grains is such that their wearing qualities upon the roadway or other surfaces engaged by them under any conditions of service, particularly upon a drive roadway, is greater than the wearing quality of the rubber body in which they are embedded. This wearing quality, however, is preferably less than that of the roadway or other surface engaged, whereby not unduly to wear the roadway or other coacting surface.

The intervened bonding material is a material on the one hand susceptible of the most intimate mechanical interlocking or adhesive bonding to the granular structures and on the other hand possessing a substantially higher bonding quality to the body of rubber composing the tread at large than the material of the grains. I propose for such bonding materials, brass or latex.

Brass may be used by melting the brass, applying it in molten or liquid form to the grains, separating the grains from each other while the brass is still in molten or liquid condition and adhering to the grains, thereupon solidifying the adhering brass about the grains, and finally introducing the brass in closed grains to the mass of rubber which is to compose the tread and vulcanizing them therein. The molten brass permeates the recesses and pores of the grains and constitutes itself a closed casing or matrix for each individual grain. Brass when vulcanized to rubber, is known to possess an extremely high strength of bonded joint thereto.

Latex may be utilized as the bonding material by producing a vacuum in the space occupied by the grains to be used, breaking the vacuum by induction of liquid latex, which thereupon permeates the recesses and pores of the grains, separating the grains while the latex is still in liquid form, solidifying the latex upon the separated grains by any known process such as either the acid or vulcanizing process, and finally introducing the separated grains to the mass of rubber which is to constitute the body of the tread and vulcanizing them therein. The solidified latex likewise provides matrix for the grain perhaps even more perversely interlocked with the material of the grain than the brass bonding material. The bonding of rubber to rubber achieved through vulcanizing of these rubber encased grains in the tread is known to be of a very high quality, of a great degree of strength, considerably greater than that which can be attained through direct vulcanization of abrasive material to the main mass of rubber in the tread. Moreover, the bonding latex casing can be of rubber of a different quality and its solidifying can be of a different order from that of the rubber in the main body of the tread. It is proposed that the rubber of the bonding material be subjected to such solidifying process as to render it more tenacious and at the same time more resistant to cutting by the grains than need be the main body of the material of the tread.

The rubber constituting the main body of the tread and to which the abrasive grains or pellets are bonded according to my invention, has a wearing quality upon the usual roadways such that it may be worn down by travel over the roadway at a rate greater than that of the road-gripping grains or pellets. Thereby, the grains or pellets as unbreakably bonded thereto by the bonding means specified in a short time become the prominences of the tread surface. The body of rubber forming the tread moreover is possessed of a yieldability and elasticity greater than that of the rubber in the treads of the standard pneumatic tires of today, whereby the yieldability of the tread as a whole body of rubber plus incorporated road gripping grains and pellets is possessed of general yieldability and elasticity substantially the same as that of the treads of standard pneumatic tires of today. The ratio of the aggregate mass of rubber comprising the main body of the tread to the aggregate mass of the incorporated road gripping grains and pellets, and the size and the number of the pellets are such that those smaller stones and rocks and pieces of stones and rocks and the like which ordinarily depress the body of the rubber in the face of the tread without resulting wheel movement will act similarly upon the tread of my invention.

In the accompanying sheet of drawings I show the following sections which are believed to constitue an aid in visualizing the invention:

Figure 2:
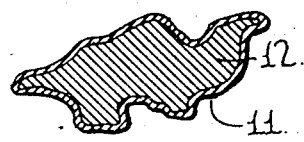
Fig. 2 is a transverse section through a grain or pellet encased in brass or other metal.
Figure 3:
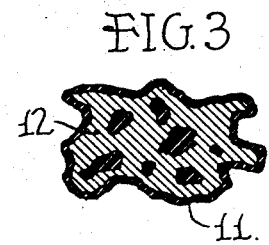
Fig. 3 is a transverse section through a grain or pellet encased in latex rubber.

In each of the figures the mass of rubber which constitutes the main body of the tread is designated 10, the bonding material encasing the grains or pellets is designated 11, and the grains or pellets themselves are designated 12. The difference between the pellet encased in the metallic bonding material as depicted in Fig. 2 and that encased in the latex bonding material in Fig. 3 is principally that in the instance of the latex bonding material, the material more readily pervades the porous mass of the pellet, whereas the metallic bond may reach only into the surface recesses. It is, of course, conceivable that the metallic bond might also be made to reach through the pores of the pellet mass by introduction through the vacuum process as in the instance of the latex introduction above described or through other appropriate device. With the pellets having irregular raised surfaces possessed of numerous angles and recesses or the like, however, adequate interlock for the metallic bonding material is provided without supplementation through pervasion of pores. In such case indeed the pellet might be without pores.

Figure 1:
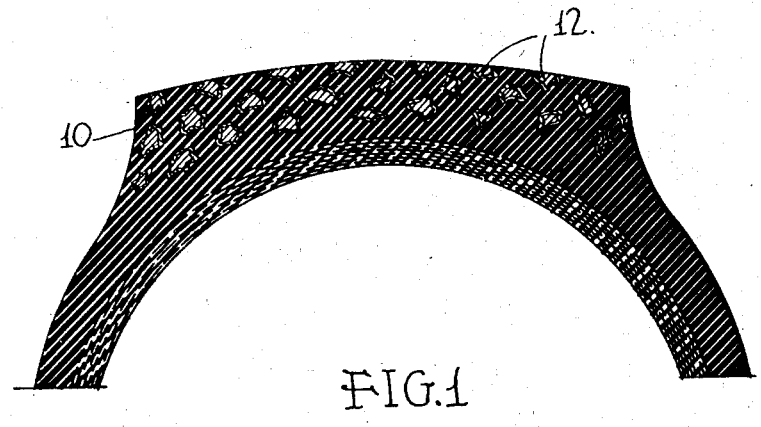
Fig. 1 is a transverse section through a tire tread constituted according to the invention.
Figure 4:
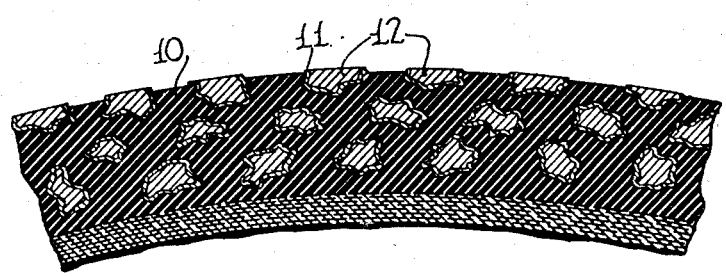
Fig. 4 is a section through such a tread as employed upon an automobile wheel tanken substantially in the medial plane of the wheel.

The showing of Figs. 1 and 4 makes clear the general separation of the pellets from each other by intervened rubber body material, such that the pellets generally can have a measure of independent movement each with respect to the others. This showing particularly in Fig. 4, also portrays the prominences constituted by the gripping grains or pellets at the surface due to the relatively greater rate of wear of the rubber body between them. There also appears clearly in Figs. 1 and 4, the manner of operation of the matrices of bonding material in which the gripping grains or pellets are encased, and which serve to hold unbreakably to the surface of the tread, all portions of the grains and pellets whatsoever, and this, irrespective of the degree to which they are worn down. This is due jointly by reason of the extent and thoroughness of the interlocking of the bonding material 11 with the grains or pellets 12 and the unbreakable bond between the material 11 (brass, latex or other) which constitutes the matrix and the mass of rubber constituting the body of the tread. The complete encasement of the grains or pellets in their bonding matrices moreover illustrates the fullness with which the rubber of the main body is protected from cutting, abrasion and breaking, which might result if there were free direct embedding of the pellets in the body. Whether the grains or pellets be large or small therefore, their anchorage to the tread is such that neither parts of them nor all of them can be detached and thrown by centrifugal force. The general spacing of the pellets from each other by the body of intervening rubber also prevents cutting and breaking through forced rubbing or grinding of one matrix 11 upon another. This general spacing apart by the rubber of the main body is insured through full admixing of the grains and pellets with the body of rubber prior to their vulcanization thereto, and such uniform admixture with general spacing is furthered by the adjustment of the specific gravity of the grains and pellets to a value not far removed from that of the rubber mass in which they are embedded, at least within that range of approach thereto which is readily compensated for by the viscosity of the rubber mass at the time of vulcanization.

The action of the grains or pellets as exposed upon the wearing surface of the tread is also apparent. Long before the usual road gripping configuration of a new tire becomes worn down appreciably the grains or pellets have their outer surfaces completely exposed, the bonding material of their matrices being worn away simultaneously. The rubber of the main body of the tread becomes furrowed by greater wear between the exposed faces of the grains or pellets, and the whole wearing surface of the tread is studded with the grains or pellets to constitute prominences. The action of these prominences in gripping the road, especially when the road surface is slippery, is obvious. Each prominence engages the slippery surface (as indeed the dry surfaces) with decidedly greater frictional interlock than a plain rubber surface can do. The furrows between the prominences also have a vacuum gripping effect of some degree. The tread, however, is borne to a large extent upon the road gripping prominences and they not only grip the road, but also take the principal wear from the body of the rubber.

Yet further, number and size of the prominences is such and their radial superimposition is such that such a tread is decidedly more puncture proof than any other.

It is a further feature of my invention that the gripping pellets shall be of such size that a puncturing thing, such as a nail, can not radially or laterally displace the pellet to make room for itself between the generally radially superimposed and overlapping pellets. Not only the size but the number of the pellets, their proximity to each other and the general thickness of the tread body in which they are embedded are combined to increase this resistance to penetration in appropriate degree without lowering the overall yieldability of the tread.

Finally, it is a feature of my invention to constitute the pellets themselves of a material having a high friction coefficient on ice and snow, since these latter constitute the greatest cause of decrease of wheel grip upon the roadway. I have found that different kinds of sand and abrasives of the coarseness of carborundum wheels such as ordinarily made, constitute excellent means of gripping ice and snow. I have also found that such materials when rotated against ice and snow generate insufficient heat through the friction to permit glazing of their gripping surfaces. I contemplate using grains or pellets of solid masses of these materials, or of masses constituted by a conglomeration of grains of these materials held together by appropriate bonding material. Sands having their surfaces rendered irregular with or without general porosity and hardened through heat processings, will make excellent gripping material. Slags from certain furnaces, as for example, aluminum, glass or carborundum furnaces, and certain of the slags from other furnaces constitute by-product sources of grains and pellets of suitable size and quality.

Obviously, my invention is susceptible of many modifications without departing from those elements affording a generic spirit. All such modifications, insofar as they partake of the generic spirit of any element, fall within the purview of my invention.

What I claim is:

1. The method of manufacturing the rubber wearing body of wheels, such body containing granular material and bonding material intervened between the granular material and the rubber, which consists in first applying the intervened bonding material to the granular material in liquid form, then rendering the bonding material less liquid, and thereafter introducing the grains encased in bonding material to the rubber which is to constitute the wearing body of the wheel and bonding them thereto.

2. Method according to claim 1 in which the grains of granular material are maintained separated from each other during the solidifying of the encasing bonding material.

3. Method according to claim 1 in which the bonding material is a metal such as brass, and is applied to the granular material by immersing the granular material in molten metal.

4. Method according to claim 1 in which the introduction of the grains of granular material encased in bonding material to the rubber is achieved by mixing them with the rubber mass which is to constitute the wearing body of the wheel and vulcanizing them in the admixed relation.

5. Method according to claim 1 in which the encasing bonding material is latex.

6. Method according to claim 1 in which application of the bonding material comprises the following intermediate steps, first producing a vacuum in the space occupied by the granular material and breaking the vacuum by introducing the bonding material in liquid form to the vacuum so produced.

7. Method according to claim 1 in which the granular material is provided with mechanically acting bond locking recesses at the time of application of the bonding material thereto.

JOHN P. TARBOX.